(No Model.)

R. W. HENT.
ROLLER BEARING.

No. 395,052. Patented Dec. 25, 1888.

Witnesses:
Joseph H. Moore
John M. Moore

Inventor:
Reuben W. Hent

UNITED STATES PATENT OFFICE.

REUBEN W. HENT, OF SAN FRANCISCO, CALIFORNIA.

ROLLER-BEARING.

SPECIFICATION forming part of Letters Patent No. 395,052, dated December 25, 1888.

Original application filed April 16, 1887, Serial No. 235,040. Divided and this application filed March 23, 1888. Serial No. 268,234.
(No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent filed March 3, 1888, Serial No. 266,084, in which a ring bears at its periphery on journals of a series of bearing-rollers bearing directly on the shaft and casing, and at its inner side on journals of a series of separating-rollers bearing neither on the shaft nor casing, but on the bearing-rollers, keeping the latter separate from each other, and a smaller (or inner) ring bears at its periphery on journals of the separating-rollers, and a larger (or outer) ring bears at its inner side on journals of the bearing-rollers. In said roller-bearing the bearing-rollers after wear cannot each be in contact with two separating-rollers at the same time.

The object of my improvement is to keep each bearing-roller in constant contact with the two separating-rollers between which it is located. This object is attained by providing the shaft and casing with sleeves a little shorter than and in lieu of the shaft and casing, forming bearings for the bearing-rollers, thereby exempting from substantial wear those portions of the latter rollers which do not bear on the sleeves, but only on the separating-rollers. In such sleeves and the peculiar construction and combinations of the parts hereinafter set forth consists, essentially, my improvement.

It is illustrated in the accompanying drawings, in which—

Figure 1:
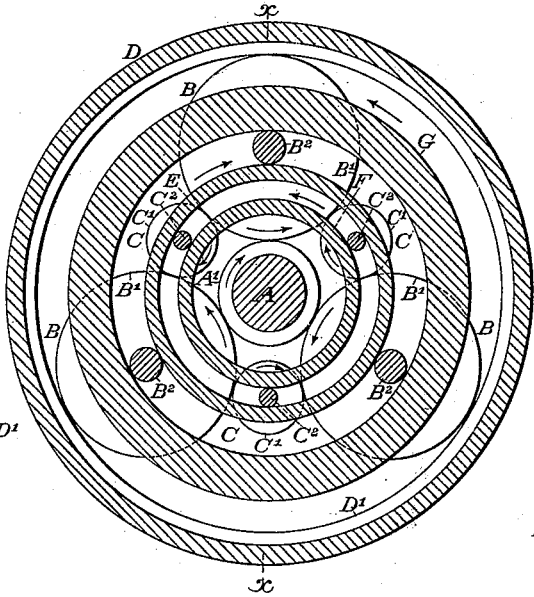
Figure 2:
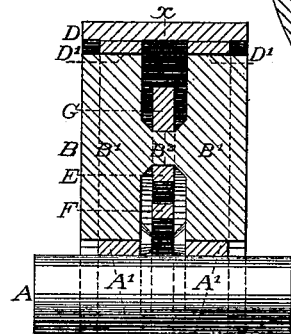
Figure 3:
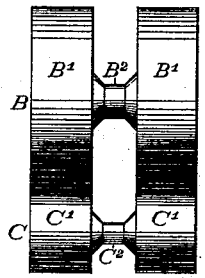
Figure 4:
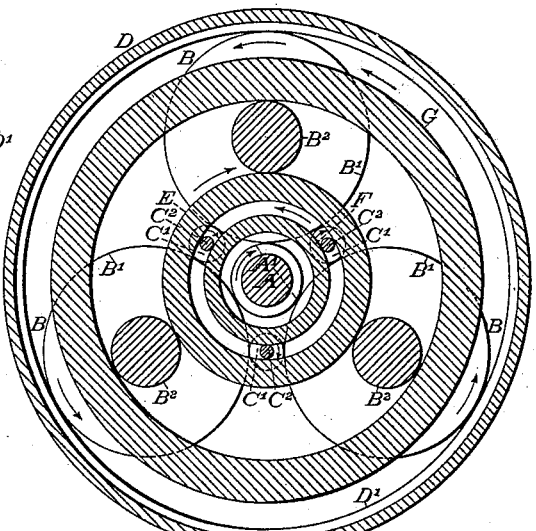
Figure 7:
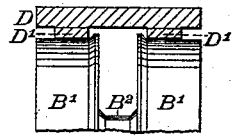
Figure 8:
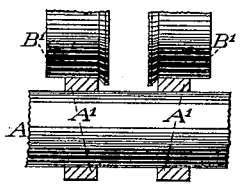
Figure 9:
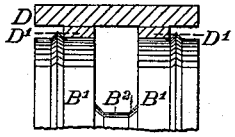
Figure 10:
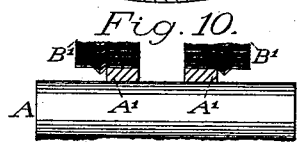

Figure 1 is a transverse section through the center or on the line $x\ x$, Fig. 2, of a roller-bearing embodying my improvement. Fig. 2 is a longitudinal section through the center or on the line $x\ x$, Fig. 1. Fig. 3 is a side view of a bearing-roller and a separating-roller, Fig. 1, showing the relative positions of the rollers as seen along the plane tangent to both. Fig. 4 is a transverse section through the center of my improved roller-bearing in which the axes of the separating-rollers are in the planes of the axes of the bearing-rollers. Figs. 5, 6, 7, 8, 9, and 10 are views showing means of retaining the several parts in their proper longitudinal positions, Fig. 6 also showing a separating-roller bearing only on those portions of the bearing-rollers which do not bear on said sleeves.

A represents the shaft; A', the sleeves of the shaft; B, the bearing-rollers as wholes; C, the separating-rollers as wholes; D, the casing; D', the sleeves of the casing, (or the bushing,) and E, F, and G the rings.

The rings are hollow cylinders coaxial with the shaft and with each other and of different diameters, F representing the smaller, (or inner,) G the larger, (or outer,) and E the intermediate ring.

Each bearing-roller B consists of two journals, B', and of a smaller journal, B², located between and coaxial with the journals B' and rotating between and in contact with the periphery of the ring E and the inner side of the ring G.

The separating-rollers C, keeping the rollers B separate from each other, consist each of two journals, C', and of a smaller journal, C², located between and coaxial with the journals C' and rotating between and in contact with the inner side of the ring E and the periphery of the ring F.

The sleeves A' and D' are hollow cylinders of equal length, are a little shorter than the journals B', and have their inner ends in the same planes with the inner ends of the journals B', so that the latter journals project a short distance beyond the outer ends of the sleeves.

The sleeves A' are fitted closely upon and fastened to the shaft A, and the sleeves (or bushing) D' are fitted closely within and fastened to the casing D, the sleeves A', with those portions of the shaft to which they are fitted, constituting the central journal, and the sleeves D', with those portions of the casing to which they are fitted, constituting the bearing-casing.

The journals B' the greater portions of their lengths bear directly on the sleeves A' and D', without touching either the shaft A or the casing D, and the remaining portions of their lengths (projections beyond the sleeves) bear only on the journals C'. The journals C' bear neither on the sleeves A' nor on the sleeves D′, but on the projections of the journals B′, each journal C′ being on and between the projections of two journals, B′. The intermediate ring, E, is interposed between and bears on the journals B² at its periphery and the journals C² at its inner side. The smaller (or inner) ring, F, bears at its periphery on the journals C², and the larger (or outer) ring, G, bears at its inner side on the journals B².

The arrow-heads indicate the relative directions when the casing is stationary of the axial rotations of the shaft and rollers and of the rings caused by the axial rotations of the journals B² and C².

The sleeves A′ and D′ and the portions of the journals B′ bearing thereon receive all the pressure of the load and incur substantial wear; but the rings, the journals rotating in contact therewith, the journals C′, and said projections of the journals B′ bearing thereon, receiving none of this pressure and being required only to resist pressures which are too slight to cause substantial wear, retain substantially their original dimensions. Therefore, despite all the changes in the dimensions of the parts subject to the pressure of the load and liable to substantial wear, not only will the rings E and G form bearings independent of the central journal and the casing for the rollers B when not under the pressure of the load, the three rings be kept coaxial, the journals B² and C² kept in contact with the ring E, and the orbits of the two series of rollers kept circular, constant, and concentric, as in my said roller-bearing, (application Serial No. 266,084,) but also the journals C′, as well as the ring E, will form bearings independent of the central journal for the rollers B when not under the pressure of the load, the proportions necessary to avoid sliding friction between the ring E and the journals B² and C² will be preserved, the axes of the rollers B and C will be kept equidistant and parallel, each journal B′ will be kept in constant contact with two journals, C′, and the rollers B and C will be held and kept compactly and exactly in their proper relative positions by parts exempt from all substantial wear and rotating without sliding friction.

In my roller-bearing (shown and described in my application for patent, filed April 16, 1887, Serial No. 235,040) in which the ring E is the only ring employed, in my roller-bearing (shown and described in my application for patent, filed February 18, 1888, Serial No. 264,520) in which the rings E and F are the only rings employed, and in my roller-bearing (shown and described in my application for patent, filed February 27, 1888, Serial No. 265,434) in which the rings E and G are the only rings employed said anti-friction proportions will also be preserved. In said roller-bearings applications Serial Nos. 235,040 and 264,520 the projections of the journals B′ will be prevented from shifting from the journals C′ more than one-half the distance the journals B′ could shift without said sleeves, and in said roller-bearing application Serial No. 265,434 said projections will perform all the functions of the ring F and render its employment unnecessary if the axes of the rollers C are without the figure (equilateral triangle) formed by the planes of the axes of the rollers B, as shown in Fig. 1. My invention is therefore an improvement, also, on said roller-bearings applications Serial Nos. 235,040, 264,520, and 265,434.

Figure 5:
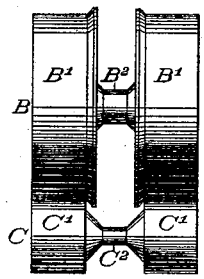
Figure 6:
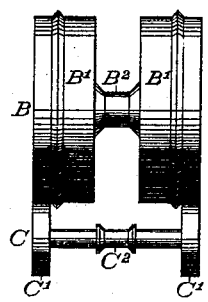

If the journals C′ are of the same length as the journals B′, as shown in Figs. 2, 3, and 5, after a little wear of those portions of the latter journals which bear on the sleeves the journals C′ will touch only those portions of the journals B′ which project beyond the sleeves. Such length of the journals C′ being therefore wholly unnecessary and even detrimental, if the velocity (centrifugal force) of the rollers C in their orbit is very great the journals C′ are preferably made no longer than said projections of the journals B′, as shown in Fig. 6. Incidentally the sleeves also facilitate the employment of flanges on the journals B′ to keep the rollers B in their longitudinal positions upon the central journal and within the bearing-casing, as shown in Figs. 5, 6, 7, 8, 9, and 10.

The sleeves may be solid with the shaft or casing, but preferably are made separately and fastened so as to be easily removed after wear.

All the journals B′ and C′ may be formed separate from and securely and rigidly attached to the journals B² and C², or all or any of them (except, of course, those necessarily removable to permit the insertion between the shaft and casing of the rollers and rings in their proper relative positions) may be formed integral with the journals B² and C², respectively.

It is evident that instead of the inner the outer ends of the sleeves and journals B′ may be in the same planes; also, that instead of two sleeves A′ and two sleeves D′ only one sleeve A′ and one sleeve D′, or three or more sleeves A′ and an equal number of sleeves D′ of the same length as and located between the same planes as the sleeves A′ may be employed, the journals C′ always bearing on the portions of the journals B′ not bearing on the sleeves. Therefore I do not intend to limit my claims to any particular number of sleeves A′ and D′ nor to any particular longitudinal location of said sleeves relatively to the journals B′.

I claim as my invention—

1. In a roller-bearing, the combination, between the shaft and casing, of sleeves upon the shaft and sleeves within the casing with a series of bearing-rollers having journals bearing only portions of their lengths on the sleeves and having journals rotating in contact with the periphery of a ring, and a series of separating-rollers keeping the bearing-rollers separate from each other and having journals not bearing on the sleeves, but on the portions of said first-mentioned journals not bearing on the sleeves, and having journals rotating in contact with the inner side of said ring, all substantially as and for the purposes set forth.

2. In a roller-bearing, the combination, between the shaft A and the casing D, of the sleeves A' and D' with the series of bearing-rollers B, consisting each of two journals, B', bearing directly on and projecting beyond the sleeves A' and D', and of a journal, B², located between the journals B' and rotating in contact with the periphery of the ring E, the series of separating-rollers C, keeping the rollers B separate from each other, and consisting each of two journals, C', not bearing on the sleeves, but on the projections of the journals B', each journal C' on and between the projections of two journals, B', and of a journal, C², located between the journals C' and rotating in contact with the inner side of said ring E, and the said ring E, bearing at its periphery on the journals B² and at its inner side on the journals C², all constructed, arranged, and operating substantially as shown and described, and for the purposes set forth.

3. A roller-bearing comprising the shaft provided with a sleeve or sleeves, the casing provided with a sleeve or sleeves equaling in number and length the sleeves of the shaft and located between the same planes as the latter, a series of bearing-rollers consisting of journals bearing only portions of their lengths directly on said sleeves and of journals rotating in contact with the periphery of a ring coaxial with the shaft, a series of separating-rollers keeping the bearing-rollers separate from each other and consisting of journals bearing on none of said sleeves, but on the portions of said first-mentioned journals not bearing on said sleeves, and of journals rotating in contact with the inner side of said ring, and the said ring bearing at its periphery on journals of the bearing-rollers and at its inner side on journals of the separating-rollers, all combined substantially as and for the purposes set forth.

4. A roller-bearing comprising the shaft A, provided with the sleeves A', the casing D, provided with the sleeves D', the series of bearing-rollers B, consisting each of two journals, B', bearing directly on and projecting beyond the sleeves A' and D', and of a journal, B², located between the journals B' and rotating in contact with the periphery of the ring E, the series of separating-rollers C, consisting each of two journals, C', bearing neither on the sleeves A' nor the sleeves D', but on the projections of the journals B', each journal C' on and between the projections of two journals, B', and of a journal, C², located between the journals C' and rotating in contact with the inner side of said ring E, and the said ring E, bearing at its periphery on the journals B² and at its inner side on the journals C², all constructed, arranged, combined, and adapted to operate substantially as shown and described, and for the purposes set forth.

5. In a roller-bearing, the combination, between the shaft and casing, of sleeves upon the shaft and sleeves within the casing, with a series of bearing-rollers having journals bearing only portions of their lengths on the sleeves and having journals rotating in contact with the periphery of a ring, and a series of separating-rollers keeping the bearing-rollers separate from each other and having journals not bearing on the sleeves, but on the portions of said first-mentioned journals not bearing on the sleeves, and having journals rotating in contact with the inner side of said ring and in contact with the periphery of a smaller ring, all substantially as and for the purposes set forth.

6. In a roller-bearing, the combination, between the shaft A and the casing D, of the sleeves A' and D' with the series of bearing-rollers B, consisting each of two journals, B', bearing directly on and projecting beyond the sleeves A' and D', and of a journal, B², located between the journals B' and rotating in contact with the periphery of the ring E, the series of separating-rollers C, keeping the rollers B separate from each other and consisting each of two journals, C', not bearing on the sleeves, but on the projections of the journals B', each journal C' on and between the projections of two journals, B', and of a journal, C², located between the journals C' and rotating between and in contact with the inner side of said ring E and the periphery of the ring F, the said ring E, bearing at its periphery on the journals B² and at its inner side on the journals C², and the said ring F, bearing at its periphery on the journals C², all constructed, arranged, and operating substantially as shown and described, and for the purposes set forth.

7. A roller-bearing comprising the shaft provided with a sleeve or sleeves, the casing provided with a sleeve or sleeves equaling in number and length the sleeves of the shaft and located between the same planes as the latter, a series of bearing-rollers consisting of journals bearing only portions of their lengths directly on said sleeves and of journals rotating in contact with the periphery of a ring coaxial with the shaft, and a series of separating-rollers keeping the bearing-rollers separate from each other and consisting of journals bearing on none of said sleeves, but on the portions of said first-mentioned journals not bearing on said sleeves, and of journals rotating in contact with the inner side of said ring and in contact with the periphery of a smaller ring also coaxial with the shaft, the said first-mentioned ring bearing at its periphery on journals of the bearing-rollers and at its inner side on journals of the separating-rollers, and said smaller ring bearing at its periphery on journals of the separating-rollers, all combined substantially as and for the purposes set forth.

8. A roller-bearing comprising the shaft A, provided with the sleeves A', the casing D, provided with the sleeves D', the series of bearing-rollers B, consisting each of two journals, B', bearing directly on and projecting beyond the sleeves A' and D', and of a journal, B², located between the journals B' and rotating in contact with the periphery of the ring E, the series of separating-rollers C, consisting each of two journals, C', bearing neither on the sleeves A' nor the sleeves D', but on the projections of the journals B', each journal C' on and between the projections of two journals, B', and of a journal, C², located between the journals C' and rotating between and in contact with the inner side of said ring E and the periphery of the ring F, the said ring E, bearing at its periphery on the journals B² and at its inner side on the journals C², and the said ring F, bearing at its periphery on the journals C², all constructed, arranged, combined, and adapted to operate substantially as shown and described, and for the purposes set forth.

9. In a roller-bearing, the combination, between the shaft and casing, of sleeves upon the shaft and sleeves within the casing with a series of bearing-rollers having journals bearing only portions of their lengths on the sleeves and having journals rotating in contact with the periphery of a ring and in contact with the inner side of a larger ring, and a series of separating-rollers keeping the bearing-rollers separate from each other and having journals not bearing on the sleeves, but on the portions of said first-mentioned journals not bearing on the sleeves, and having journals rotating in contact with the inner side of said first-mentioned ring, all substantially as and for the purposes set forth.

10. In a roller-bearing, the combination, between the shaft A and the casing D, of the sleeves A' and D' with the series of bearing-rollers B, consisting each of two journals, B', bearing directly on and projecting beyond the sleeves A' and D', and of a journal, B², located between the journals B' and rotating between and in contact with the periphery of the ring E and the inner side of the ring G, the series of separating-rollers C, keeping the rollers B separate from each other and consisting each of two journals, C', not bearing on the sleeves, but on the projections of the journals B', each journal C' on and between the projections of two journals, B', and of a journal, C², located between the journals C' and rotating in contact with the inner side of said ring E, the said ring E, bearing at its periphery on the journals B² and at its inner side on the journals C², and the said ring G, bearing at its inner side on the journals B², all constructed, arranged, and operating substantially as shown and described, and for the purposes set forth.

11. A roller-bearing comprising the shaft provided with a sleeve or sleeves, the casing provided with a sleeve or sleeves equaling in number and length the sleeves of the shaft and located between the same planes as the latter, a series of bearing-rollers consisting of journals bearing only portions of their lengths directly on said sleeves and of journals rotating in contact with the periphery of a ring coaxial with the shaft and in contact with the inner side of a larger ring also coaxial with the shaft, and a series of separating-rollers keeping the bearing-rollers separate from each other and consisting of journals bearing on none of said sleeves, but on the portions of said first-mentioned journals not bearing on said sleeves, and of journals rotating in contact with the inner side of said first-mentioned ring, the said first-mentioned ring bearing at its periphery on journals of the bearing-rollers and at its inner side on journals of the separating-rollers, and said larger ring bearing at its inner side on journals of the bearing-rollers, all combined substantially as and for the purposes set forth.

12. A roller-bearing comprising the shaft A, provided with the sleeves A', the casing D, provided with the sleeves D', the series of bearing-rollers B, consisting each of two journals, B', bearing directly on and projecting beyond the sleeves A' and D', and of a journal, B², located between the journals B' and rotating between and in contact with the periphery of the ring E and the inner side of the ring G, the series of separating-rollers C, consisting each of two journals, C', bearing neither on the sleeves A' nor the sleeves D', but on the projections of the journals B', each journal C' on and between the projections of two journals, B', and of a journal, C², located between the journals C' and rotating in contact with the inner side of said ring E, the said ring E, bearing at its periphery on the journals B² and at its inner side on the journals C², and the said ring G, bearing at its inner side on the journals B², all constructed, arranged, combined, and adapted to operate substantially as shown and described, and for the purposes set forth.

13. In a roller-bearing, the combination, between the shaft and casing, of sleeves upon the shaft and sleeves within the casing with a series of bearing-rollers having journals bearing only portions of their lengths on the sleeves and having journals rotating in contact with the periphery of a ring and in contact with the inner side of a larger ring, and a series of separating-rollers keeping the bearing-rollers separate from each other and having journals not bearing on the sleeves, but on the portions of said first-mentioned journals not bearing on the sleeves, and having journals rotating in contact with the inner side of said first-mentioned ring and in contact with the periphery of a smaller ring, all substantially as and for the purposes set forth.

14. In a roller-bearing, the combination, between the shaft A and the casing D, of the sleeves A' and D' with the series of bearing-rollers B, consisting each of two journals, B', bearing directly on and projecting beyond the sleeves A' and D', and of a journal, B², located between the journals B' and rotating between and in contact with the periphery of the ring E and the inner side of the ring G, the series of separating-rollers C, keeping the rollers B separate from each other and consisting each of two journals, C', not bearing on the sleeves, but on the projections of the journals B', each journal C' on and between the projections of two journals, B', and of a journal, C², located between the journals C' and rotating between and in contact with the inner side of said ring E and the periphery of the ring F, the said ring E, bearing at its periphery on the journals B² and at its inner side on the journals C², the said ring F, bearing at its periphery on the journals C², and the said ring G, bearing at its inner side on the journals B², all constructed, arranged, and operating substantially as shown and described, and for the purposes set forth.

15. A roller-bearing comprising the shaft provided with a sleeve or sleeves, the casing provided with a sleeve or sleeves equaling in number and length the sleeves of the shaft and located between the same planes as the latter, a series of bearing-rollers consisting of journals bearing only portions of their lengths directly on said sleeves and of journals rotating in contact with the periphery of a ring coaxial with the shaft and in contact with the inner side of a larger ring also coaxial with the shaft, and a series of separating-rollers keeping the bearing-rollers separate from each other and consisting of journals bearing on none of said sleeves, but on the portions of said first-mentioned journals not bearing on said sleeves, and of journals rotating in contact with the inner side of said first-mentioned ring and in contact with the periphery of a smaller ring also coaxial with the shaft, the said first-mentioned ring bearing at its periphery on journals of the bearing-rollers and at its inner side on journals of the separating-rollers, said larger ring bearing at its inner side on journals of the bearing-rollers and said smaller ring bearing at its periphery on journals of the separating-rollers, all combined substantially as and for the purposes set forth.

16. A roller-bearing comprising the shaft A, provided with the sleeves A', the casing D, provided with the sleeves D', the series of bearing-rollers B, consisting each of two journals, B', bearing directly on and projecting beyond the sleeves A' and D', and of a journal, B², located between the journals B' and rotating between and in contact with the periphery of the ring E and the inner side of the ring G, the series of separating-rollers C, consisting each of two journals, C', bearing neither on the sleeves A' nor the sleeves D', but on the projections of the journals B', each journal C' on and between the projections of two journals, B', and of a journal, C², located between the journals C' and rotating between and in contact with the inner side of said ring E and the periphery of the ring F, the said ring E, bearing at its periphery on the journals B² and at its inner side on the journals C², the said ring F, bearing at its periphery on the journals C², and the said ring G, bearing at its inner side on the journals B², all constructed, arranged, combined, and adapted to operate substantially as shown and described, and for the purposes set forth.

REUBEN W. HENT.

Witnesses:
 JOSEPH H. MOORE,
 JOHN M. MOORE.